United States Patent
Fages

(10) Patent No.: US 10,759,518 B2
(45) Date of Patent: Sep. 1, 2020

(54) GEARBOX ASSEMBLY

(71) Applicant: Ratier-Figeac SAS, Figeac (FR)

(72) Inventor: Christian Fages, Saint-Félix (FR)

(73) Assignee: RATIER-FIGEAC SAS, Figeac (FR)

( * ) Notice: Subject to any disclaimer, the term of this patent is extended or adjusted under 35 U.S.C. 154(b) by 331 days.

(21) Appl. No.: 15/710,861

(22) Filed: Sep. 21, 2017

(65) Prior Publication Data

US 2018/0141643 A1    May 24, 2018

(30) Foreign Application Priority Data

Nov. 21, 2016   (EP) .................................... 16306527

(51) Int. Cl.
| | |
|---|---|
| *B64C 13/34* | (2006.01) |
| *F16H 35/10* | (2006.01) |
| *F16D 9/06* | (2006.01) |
| *B64C 13/28* | (2006.01) |
| *B64C 13/10* | (2006.01) |
| *F16H 1/20* | (2006.01) |
| *F16H 55/08* | (2006.01) |
| *B64C 19/00* | (2006.01) |

(52) U.S. Cl.
CPC .............. *B64C 13/34* (2013.01); *B64C 13/10* (2013.01); *B64C 13/341* (2018.01); *F16D 9/06* (2013.01); *F16H 1/206* (2013.01); *F16H 35/10* (2013.01); *F16H 55/0846* (2013.01); *B64C 19/00* (2013.01); *F16D 2250/0061* (2013.01)

(58) Field of Classification Search
CPC ....... F16H 35/10; B64C 13/34; B64C 13/341; F16D 9/06
See application file for complete search history.

(56) References Cited

U.S. PATENT DOCUMENTS 8,746,101 B2 * 6/2014 Hausladen .............. B66C 23/86
74/421 A

FOREIGN PATENT DOCUMENTS

| CH | 424410 A | 11/1966 |
|---|---|---|
| CN | 204300281 U | 4/2015 |
| CN | 105042003 A | 11/2015 |
| CN | 204942446 U | 1/2016 |
| DE | 102009035197 A1 | 2/2011 |
| GB | 443415 A | 2/1936 |
| GB | 730332 A | 5/1955 |

OTHER PUBLICATIONS

Anonymous: "3D printing—Wikipedia", May 10, 2017, XP055371171, Retrieved from the Internet: URL:https://en.wikipedia.org/wiki/3D_printing [retrieved on May 10, 2017], 18 pages.
Extended European Search Report for International Application No. 16306527.9 dated May 22, 2017, 6 pages.

* cited by examiner

*Primary Examiner* — Luis A Gonzalez
(74) *Attorney, Agent, or Firm* — Cantor Colburn LLP

(57) ABSTRACT

A transmission or gearbox assembly with fail-safe means for providing redundancy where failure can lead to loss of torque transmission between component parts of the assembly, the assembly comprising a plurality of first components in torque transmitting engagement and at least one second component associated with at least one of the first components, the second component being joined to the respective first component by a discontinuous joint. Preferably, each first component of the system has a corresponding second component joined thereto by a discontinuous joint.

6 Claims, 2 Drawing Sheets

GEARBOX ASSEMBLY

FOREIGN PRIORITY

This application claims priority to European Patent Application No. 16306527.9 filed Nov. 21, 2016, the entire contents of which is incorporated herein by reference.

TECHNICAL FIELD

The present invention relates to gearbox assemblies, especially, but not exclusively, for aircraft.

BACKGROUND

Gearbox assemblies are provided in e.g. aircraft where aircraft parts, accessories, actuators are driven by power from the aircraft engine(s) via alternators and/or hydraulic pumps. Power from the aircraft engine drives alternators and/or hydraulic pumps and electrical and/or hydraulic power then powers actuators/electrical or hydraulic motors etc.

The rotational velocity of the motor is greater than that required or desired to drive the components, actuators, etc. and so a gearbox reduces or steps down the rotational velocity of the motor to a velocity suitable for the driven load. The gearbox reduces the rotational velocity using a number of intermeshed gears between the motor and a drive output to the parts to be driven. In reducing the rotational velocity of the motor output, torque is increased through the series of gear stages and associated shafts.

Such gearbox assemblies are used e.g. with actuators to control wing flaps, landing gear, tail flaps, Horizontal Stabilizer Trim Actuators (HSTA) also known as trimmable horizontal stabilizer actuators (THSAs) etc.

Gearbox actuator systems may be provided with brake mechanisms that prevent complete failure in the event of fracture of the power transmission shaft from the engine. One solution is known as no-back irreversibility brakes or NBB. This, in the event of shaft fracture, causes high deceleration followed by standstill, with excess kinetic energy dissipated by losses of the rotating shafts.

Such gearbox and transmission systems provide crucially important functions in aircraft, and failure of all or part of the system can be catastrophic. It is important, therefore, to perform regular and frequency safety inspections and maintenance on the many parts that make up these mechanically complex systems. This is, of course, costly and time consuming, but necessary for safety.

It is well-known that there are locations or components in a gearbox that are more vulnerable to failure than others.

It is an object of this disclosure to provide a gearbox assembly which is less vulnerable to catastrophic failure, without the need to increase safety inspections and maintenance.

SUMMARY

The present disclosure provides a transmission or gearbox assembly with fail-safe means for providing redundancy where failure can lead to loss of torque transmission between component parts of the assembly, the assembly comprising a plurality of first components in torque transmitting engagement and at least one second component associated with at least one of the first components, the second component being joined to the respective first component by a discontinuous joint.

The first components can be any combination of pinions and shafts and the second component(s) is/are a corresponding component.

Preferably each first component of the system has a corresponding second component joined thereto by a discontinuous joint.

The first and second components are preferably formed by additive manufacturing.

DETAILED DESCRIPTION

Figure 1:
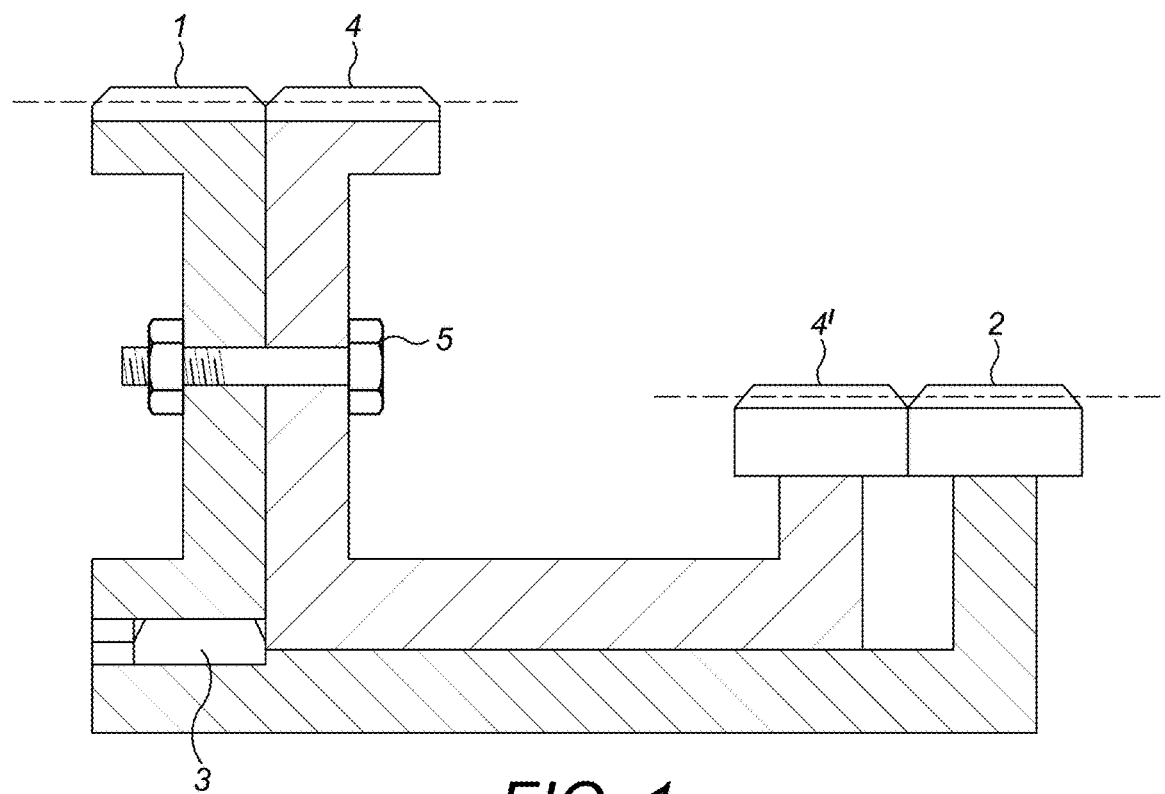
FIG. 1 is a cross-section of a conventional dual load path pinion assembly.

With reference to FIG. 1, a conventional pinion gear assembly for mounting about an input transmission shaft from the engine. The input shaft is in torque transmission engagement with one or more drive shafts via gears or pinions in the form of toothed wheels that are, in a gearbox, in meshing engagement with other toothed wheels of a subsequent gear stage.

The intermeshing gear stages thus reduce the rotational velocity from the engine, attached to the input shaft transmitting torque through the gear stages to drive the load(s) at the gearbox output.

An example of these components can be seen in the cross-section of FIG. 1 which shows a dual load path pinion gear assembly.

The example shown in FIG. 1 comprises a first pinion gear 1 of a first gear stage and a first pinion 2 of a second gear stage, in torque transmitting engagement with the first stage via key 3.

A dual load path provides a reinforcement for the shaft(s) and/or gear(s) such that the load can be shared between the first and second assemblies. This is shown in the example of FIG. 1, where redundancy is provided, also for the event that the first pinions 1, 2 fail, in the form of a second pinion 4, 4' mounted interior to the first pinions and connected thereto by means of a bolt 5. This double pinion assembly provides a dual load path whereby the first and second assemblies share the load. If a first pinion fractures or fails, torque continue to be transmitted via the first and second pinions.

Failure of the system can occur if there is a fracture in a component of the assembly, e.g. in a shaft and/or a toothed wheel. Such a fracture can interrupt the torque transmission engagement between the components and thus prevent torque being transmitted through the transmission from the input to the output.

With conventional solutions, however, the fracture can propagate through the reinforcement or second component as well as the first component.

The solution provided by the present disclosure will be explained with reference to FIGS. 2 and 3.

Figure 2:
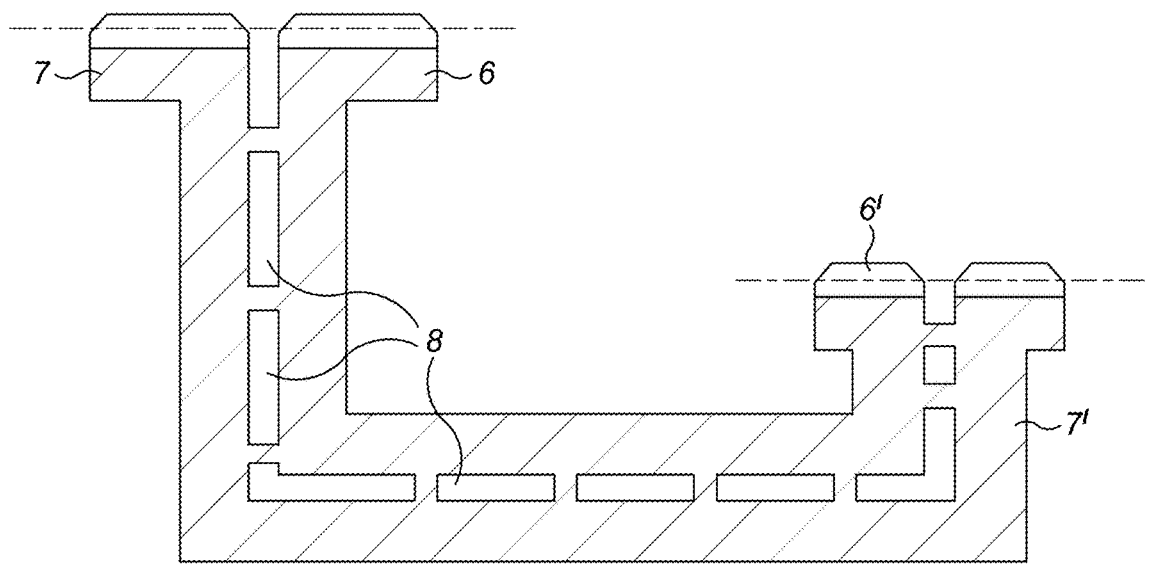
FIG. 2 is a cross-section of a dual load path pinion assembly according to this disclosure.

FIG. 2 is a cross section of the assembly of the disclosure corresponding to the arrangement of FIG. 1. FIG. 3 is a perspective, cut-away view of a similar arrangement.

The fail-safe feature of the disclosure is provided as a second or fail-safe shaft or pinion 6, 6' to provide a dual load path and redundancy to the first shaft or pinion 7, 7' and/or a second or fail-safe toothed gear wheel to provide redundancy for the first gear wheel. As can be seen, for the first pinion 7, 7', an inner, second shaft 6, 6' is provided such that the torque transmission chain is supplemented by the second shaft in a dual load path. Similarly, for the first toothed gear wheel(s), a second, inner, toothed gear wheel is provided such that if the first wheel fractures, the torque transmission chain is maintained by the second toothed wheel.

Figure 3:
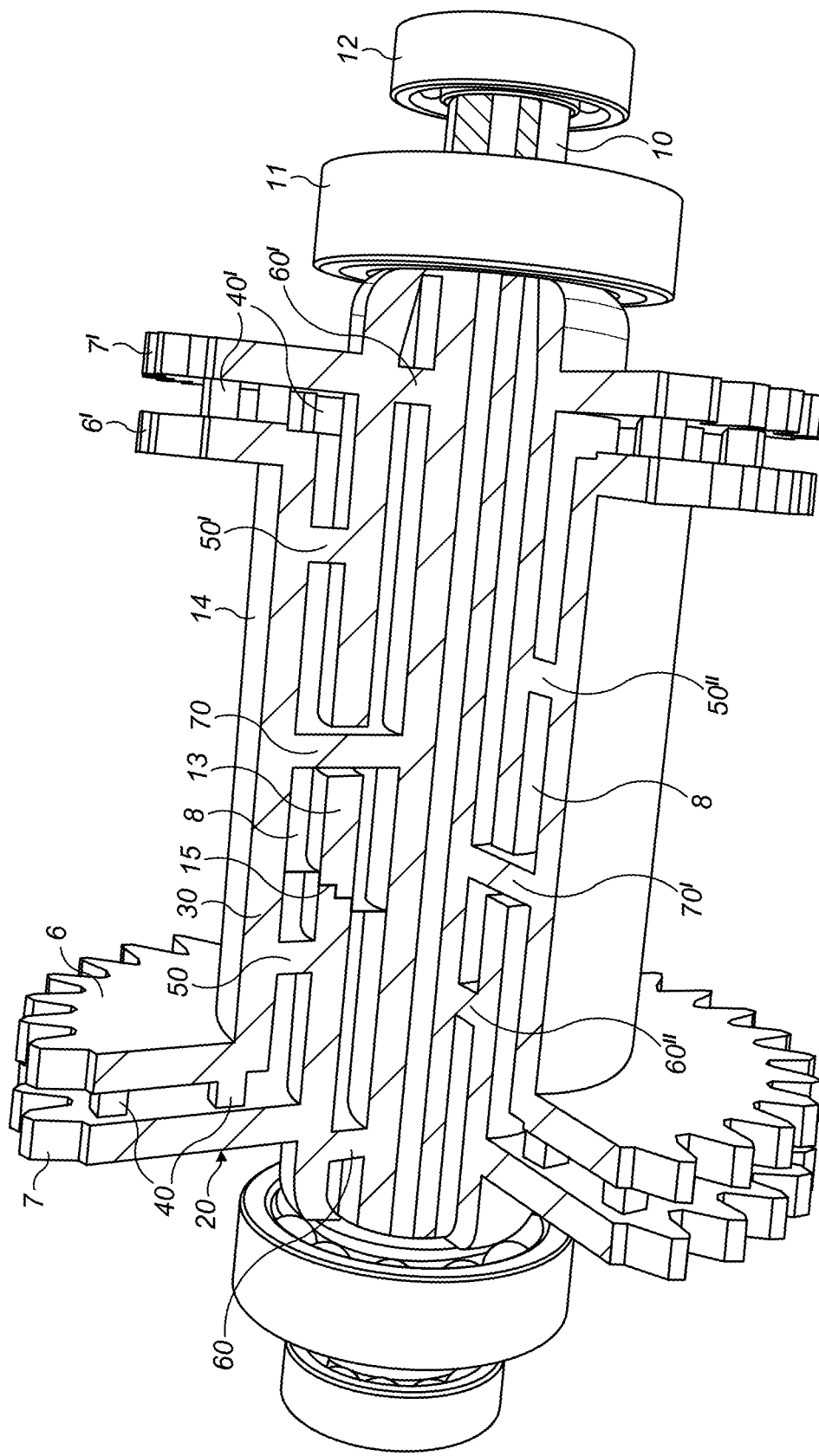
FIG. 3 is a perspective view of a dual load path pinion assembly according to this disclosure.

FIG. 3 also shows first or main bearings 11 with redundancy for the bearings provided as second bearings 12. FIG. 3 also shows shafts, wherein the assembly includes a first shaft 13 and a fail safe or second shaft 14.

Further details will now be described with reference to FIG. 3. The gear assembly is mounted about an input transmission shaft 10. The gear assembly is in the form of a dual load path assembly in that it comprises a first or main load path assembly 20 and a second load path assembly 30. In the conventional system shown in FIG. 1, the first and second load paths are connected by a continuous surface connection. In contrast, in the present disclosure, the connection between the first and second load path assemblies is discontinuous e.g. by discreet connecting pieces that connect the first and second assemblies to each other and also to the shaft 10. In the example shown, the first pinions 7, 7' are connected to the second pinions 6, 6' by connector blocks 40, 40'. The second load path assembly 30 is also connected to the first 20 by connector blocks 50, 50', 50". Further, the first, or main assembly 20 is connected to the shaft 10 by connector blocks 60, 60', 60". The second load path assembly is connected to the shaft 10 by connector blocks 70, 70'. The configuration and number of connector blocks shown in FIG. 3 is just one possible example, other configurations are possible, provided there are gaps in the joint between the load path assemblies.

According to the disclosure, such fail-safe function can be provided for all or any shafts and/or gear components of the system.

The discontinuous joint prevents any fracture propagating between the first and second components, according to the disclosure. Although the first and corresponding second components are still physically joined to provide a dual load path, the joint is discontinuous—i.e. there is one or more gaps 8 in the join between the first and respective second components. Thus if, for example, a fracture occurs in a part of the first shaft 13, as shown by the jagged line 15 in FIG. 3, this will not propagate to the second shaft 14, because of the gap 8. With the assembly of this disclosure, if any component is damaged, the gearing continues to function reliably.

In preferred examples, the first and respective second components are joined by a perforated joint or by discreet joints e.g. spots of material e.g. metal with gaps between.

The second or fail-safe components can be easily added to first components of an assembly by additive manufacturing and so the whole assembly can be easily and quickly manufactured in one part without the need for bolts or other connecting/fastening components. This also reduces the manufacturing costs and time as there is no lead time in waiting for additional components. The use of additive manufacturing can also reduce the overall weight of the assembly.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A transmission assembly with fail-safe means for providing redundancy where failure can lead to loss of torque transmission between component parts of the assembly, the assembly comprising:
    a plurality of first components in torque transmitting engagement; and
    at least one second component associated with at least one of the plurality of first components, the second component being joined to a respective first component by a discontinuous joint;
    wherein the plurality of first components and the at least on second component are formed by additive manufacturing.

2. The transmission assembly of claim 1 wherein the plurality of first components include one or more pinions.

3. The transmission assembly of claim 1, wherein the plurality of first components comprise one or more shafts.

4. The transmission assembly of claim 1, wherein each first component of the assembly has a corresponding second component joined thereto by a discontinuous joint.

5. A gearbox assembly with fail-safe means for providing redundancy where failure can lead to loss of torque transmission between component parts of the assembly, the assembly comprising:
    a plurality of first components in torque transmitting engagement; and
    at least one second component associated with at least one of the plurality of first components, the second component being joined to a respective first component by a discontinuous joint;
    wherein the plurality of first components and the at least on second component are formed by additive manufacturing.

6. The gearbox assembly of claim 5, wherein the first components include one or more pinions.

* * * * *